2,897,174
STYRENE-ALLYL ALCOHOL-ACRYLIC ESTER TERPOLYMERS, PROCESS FOR PREPARING SAME AND COATING COMPOSITION THEREFROM

Earl C. Chapin, Springfield, Mass., and Richard F. Smith, Delmar, N.Y., assignors to Monsanto Chemical Company, St. Louis, Mo., a corporation of Delaware No Drawing. Application January 10, 1955
Serial No. 481,003

9 Claims. (Cl. 260—43)

This invention relates to new terpolymer systems. More particularly the invention relates to terpolymer systems containing alcohol groups.

One object of this invention is to provide polymeric systems containing alcohol groups.

Another object is to provide terpolymer systems containing aromatic nuclei, ester groups and alcohol groups.

These and other objects are attained by copolymerizing a styrene compound with an acrylic ester and allyl alcohol or methallyl alcohol at elevated temperatures under autogenous pressure.

In the following examples which are illustrative of this invention, parts are parts by weight.

*Example I*

Mix together 50 parts of allyl alcohol monomer, 25 parts of styrene monomer, 25 parts of ethyl acrylate monomer and 2 parts of di-tertiarybutyl peroxide. Heat the mixture in a closed pressure vessel at 150° C. for about 30 minutes. The product is a colorless syrup comprising a solution of the polymer in unreacted monomer. Remove the monomer by vacuum distillation to obtain a white brittle solid material. Infrared analysis indicates the presence of benzene nuclei, ester groups and primary alcohol groups in the polymeric material. By analysis the polymer is found to contain about 13% combined allyl alcohol, about 47% combined ethyl acrylate and about 40% combined styrene. The allyl alcohol content corresponds to a primary alcohol group content of about 4% based on the terpolymer. The terpolymer is soluble in acetone, xylene, dimethyl formamide and xylene-butanol mixtures. A 60% solids solution thereof in xylene-butanol mixture has a viscosity of about W on the Gardner-Holt scale.

*Example II*

Mix together 60 parts of allyl alcohol monomer, 15 parts of styrene monomer and 25 parts of ethyl acrylate monomer with 2 parts of di-tertiarybutyl peroxide. Heat the mixture in a closed pressure vessel at a temperature of 150° C. for about 25 minutes. The product is a clear colorless syrup comprising the polymer dissolved in unreacted monomer. Remove the monomer by vacuum distillation at 200° C. to obtain a white brittle solid. On analysis it is found that the terpolymer consists of about 18% allyl alcohol by weight, 54% ethyl acrylate by weight and 28% styrene by weight, the allyl alcohol content corresponding to slightly over 5% primary hydroxyl groups by weight. The terpolymer is soluble in acetone, xylene, dimethyl formamide and xylene-butanol mixtures. A 60% solids solution thereof in a xylene-butanol mixture has a viscosity of about V on the Gardner-Holt scale.

*Example III*

Mix together 40 parts of monomeric allyl alcohol, 40 parts of monomeric ethyl acrylate, 20 parts of monomeric styrene and 2 parts of di-tertiarybutyl peroxide. Heat the mixture in a closed pressure vessel at a temperature of about 150° C. for about 30 minutes. The product is a clear colorless syrup comprising a solution of the terpolymer in unreacted monomer. Remove the monomer by vacuum distillation at about 200° C. to obtain a white brittle solid soluble in acetone, xylene, dimethyl formamide and xylene-butanol mixtures. A 60% solids solution thereof in xylene-butanol mixture has a viscosity of about V on the Gardner-Holt scale. The solid analyzes as about 13% allyl alcohol, 56% ethyl acrylate and 31% styrene by weight. The amount of allyl alcohol corresponds to about 4% primary alcohol groups by weight on the weight of the terpolymer.

*Example IV*

Mix together 40 parts of allyl alcohol monomer, 20 parts of ethyl acrylate monomer and 40 parts of styrene monomer with 2 parts of di-tertiarybutyl peroxide. Heat the mixture in a closed pressure vessel at about 200° C. for about 30 minutes. The product is a clear colorless syrup comprising a solution of the polymer in unreacted monomer. Remove the monomer by vacuum distillation at about 200° C. to obtain a white brittle solid soluble in acetone, xylene, dimethyl formamide, and xylene-butanol mixtures. A 60% solids solution thereof in xylene-butanol mixture has a viscosity of about G on the Gardner-Holt scale. Analysis shows that the polymer contains about 14% allyl alcohol by weight, about 33% ethyl acrylate by weight and about 53% styrene by weight. The allyl alcohol content corresponds to slightly more than 4% by weight of primary alcohol groups in the terpolymer.

*Example V*

Mix together 35 parts of allyl alcohol monomer, 50 parts of styrene monomer, 15 parts of 2-ethyl hexyl acrylate and 2 parts of di-tertiarybutyl peroxide. Heat the mixture in a closed pressure vessel at 150° C. for about 30 minutes. The product is a clear colorless syrup comprising polymer dissolved in unreacted monomer. Remove the monomer by vacuum distillation to obtain a clear brittle solid soluble in acetone, xylene, dimethyl formamide, and xylene-butanol mixtures. The terpolymer contains about 1% by weight of primary alcohol groups.

The three components of this invention are allyl alcohol or methallyl alcohol, styrene or a ring substituted styrene and an ester of acrylic or methacrylic acid. The allyl alcohol component may vary from 1 to 40% by weight of the terpolymer, the styrene component from 10 to 90% and the acrylic ester component from 2 to 70%. Among the materials comprising the styrene components are styrene, ortho, meta, and para methyl, ethyl, butyl, etc., styrenes, ortho-para or ortho-meta dimethyl or diethyl styrenes, the mono, di- and tri-chlorostyrenes, ortho methyl para chlorostyrene, etc. Mixtures of two or more members of the styrene type materials may be used. The acrylic ester component comprises alkyl esters of acrylic and methacrylic acids in which the alkyl group may contain up to about 12 carbon atoms either in a straight or branched chain. Mixtures of acrylic esters may be used.

In preparing the terpolymers of this invention, the three types of monomeric components should be mixed together with a free radical initiator and the mixture should then be heated in a closed reaction vessel under autogenous pressure at 100–250° C. The reaction should be carried out for 15 to 60 minutes to obtain conversions ranging from 25 to 70% depending on the conditions chosen.

The reaction may be carried out without the presence of a catalyst but it is preferred to use a free radical polymerization initiator such as di-tertiarybutyl peroxide, benzoyl peroxide, tertiarybutyl perbenzoate, pinacolone peroxide, etc. The amount of initiator to be effective should be at least 0.1 part and may rise as high as 5 parts per 100 parts of monomer mixture.

The products of the polymerization step are generally syrupy liquids which comprise a solution of the terpolymer in unreacted monomer. The terpolymer is easily recovered from the syrup by removing unreacted monomer either by vacuum distillation at temperatures up to 200–250° C. or by other conventional drying means. The terpolymers are generally hard rather brittle materials having little or no color. They contain from about 1 to about 15% alcohol groups by weight.

The products of this invention are particularly useful in coating compositions as the main resin constituent thereof with relatively minor amounts of other coating resins such as alkyd resins, phenol, urea and melamine formaldehyde coating resins, epoxy resins etc. Or the terpolymers may be used in relatively small amounts as modifiers for the other coating resins. Furthermore they may be esterified with drying oil acids to produce resins which will air dry. Among the most valuable coating compositions are the resins of this invention mixed with a minor amount of a methylol melamine ether.

*Example VI*

Prepare a 50% solids solution of the terpolymer of Example I in a xylene-butanol (1–1) mixture and a 50% solids solution of a trimethylol melamine butyl ether in a xylene-butanol (1–1) mixture. Mix together 7 parts of the terpolymer solution and 3 parts of the melamine ether solution until a clear homogeneous solution is obtained. From this solution, cast a film on a clean glass plate, dry the film in the air at room temperature for a few minutes e.g. 20 minutes, and then heat the film at 150° C. for about 15 minutes. The cured film is hard, clear and insoluble in aromatic solvents.

Various pigments, fillers, dyes and other conventional additives may be added to the solution such as that of Example VI to yield coating compositions. Other organic solvents than the xylene-butanol mixture may be used, e.g. ketones such as acetone and methyl ethyl ketone, benzene and mixtures of xylene or benzene with other alcohols than butanol.

The foregoing description and particularly the examples are illustrative of this invention and it is obvious that many variations may be made within the spirit and scope thereof.

What is claimed is:

1. A terpolymer consisting of an allyl alcohol component, a styrene component and an acrylic ester component, the amount of allyl alcohol component in the terpolymer varying between 1 and 40% by weight, the amount of styrene component in the terpolymer varying between 10 and 90% by weight, and the amount of acrylic ester component in the terpolymer varying between 2 and 70% by weight; said terpolymer having been prepared by the process which comprises mixing the allyl alcohol component, the styrene component and the acrylic ester component together and heating the resulting mixture to a temperature of 100–250° C. under autogenous pressure for from 15 to 60 minutes; said styrene component being a member of the group consisting of styrene, ring substituted alkyl styrenes, ring substituted chlorostyrenes, ring substituted alkyl chlorostyrenes and mixtures thereof; said acrylic ester component being a member of the group consisting of the saturated alkyl esters of acrylic and methacrylic acids, said alkyl group containing from 1 to 12 carbon atoms; and said allyl alcohol component being a member of the group consisting of allyl and methallyl alcohols and mixtures thereof.

2. A terpolymer as in claim 1 wherein the styrene component is styrene.

3. A terpolymer as in claim 1 wherein the acrylic ester component is ethyl acrylate.

4. A terpolymer as in claim 1 wherein the acrylic ester component is 2-ethyl hexyl acrylate.

5. A terpolymer as in claim 1 wherein the styrene component is styrene, the acrylic ester component is ethyl acrylate and the allyl alcohol component is allyl alcohol.

6. A process for preparing a terpolymer consisting of styrene, allyl alcohol and a saturated alkyl ester of acrylic acid in which the alkyl group contains from 1 to 12 carbon atoms which comprises preparing a mixture of 15–50% by weight of styrene, 35–60% by weight of allyl alcohol and 15–40% by weight of the saturated alkyl ester of the acrylic acid and heating the resulting mixture to a temperature of 100–250° C. under autogenous pressure for from 15 to 60 minutes.

7. An interpolymer prepared by the method of claim 6.

8. A coating composition comprising an organic solvent solution of (1) a thermosetting resin taken from the group consisting of phenol-, urea- and melamine-formaldehyde condensation products and (2) a terpolymer of claim 1.

9. A coating composition as in claim 8 wherein the thermosetting resin is a butylated melamine-formaldehyde condensation product.

References Cited in the file of this patent

UNITED STATES PATENTS

| | | |
|---|---|---|
| 2,333,635 | Britton et al. | Nov. 9, 1943 |
| 2,441,515 | Snyder | May 11, 1948 |
| 2,617,787 | Tawney | Nov. 11, 1952 |
| 2,624,722 | Kropa et al. | Jan. 6, 1953 |

FOREIGN PATENTS

| | | |
|---|---|---|
| 883,551 | France | Mar. 29, 1943 |